United States Patent [19]

Cohn-Sfetcu et al.

[11] 4,203,008
[45] May 13, 1980

[54] DIGITAL SIGNALLING RECEIVER FOR RECEIVING PCM TONES

[75] Inventors: Sorin Cohn-Sfetcu; Jackylene K. Hood, both of Ottawa; Daniel J. Doyle, Toronto, all of Canada

[73] Assignee: Northern Telecom Limited, Montreal, Canada

[21] Appl. No.: 15,325

[22] Filed: Feb. 26, 1979

[51] Int. Cl.² .............................................. H04J 3/12
[52] U.S. Cl. ................. 370/50; 179/84 VF; 364/724; 370/57; 370/69
[58] Field of Search ............ 179/15 BY, 84 VF; 364/724, 572

[56] References Cited

U.S. PATENT DOCUMENTS

| | | | |
|---|---|---|---|
| 3,683,162 | 8/1972 | Jacob et al. | 364/724 |
| 3,863,030 | 1/1975 | Mills | 179/15 BY |
| 4,021,653 | 5/1977 | Sharp et al. | 364/724 |
| 4,158,110 | 6/1979 | Ullakko et al. | 179/84 VF |

Primary Examiner—Douglas W. Olms
Attorney, Agent, or Firm—Frank Turpin

[57] ABSTRACT

A digital signalling receiver translates pulse code modulated (PCM) tone signalling into a signal format compatible with a controller in an associated time division multiplex (TDM) telephone switching facility. In the receiver, steering signals are generated in synchronism with the operation of the switching facility to direct the operation of a time shared filter. The filter performs a plurality of filter functions with a series of PCM signals received from the TDM switching facility and generates therefrom series of filter signals relative each of the filter functions. A translator identifies two filter signals having larger amplitudes than the others and if the two signals persist substantially uninterrupted (a) through a predetermined period of time, (b) within a predetermined relative amplitude range and (c) one of the two signals having at least a predetermined signal to noise ratio relative another filter signal corresponding to an allpass filter function, the translator indicates the receipt of multifrequency signalling by generating the appropriate signals in the required signal format.

11 Claims, 6 Drawing Figures

DIGITAL SIGNALLING RECEIVER FOR RECEIVING PCM TONES

The invention relates generally to tone signalling receivers and more particularly, to a digitally implemented receiver for translating pulse code modulated (PCM) tone signalling into a signal format compatible with a controller in a telephone switching facility.

Telephone signalling receivers for receiving plural frequency subscriber loop signalling or multifrequency (MF) trunk signalling have evolved from analogue into digital circuits, as exemplified in U.S. Pat. No. 3,537,001 issued on Oct. 27, 1970, to J. J. Friend and in U.S. Pat. No. 3,790,720 issued on Feb. 5, 1974 to K. R. Schartmann. However, these receivers are intended for receiving analogue signalling and are not directly adaptable to receiving digital signals. Consequently, in a time division multiplex (TDM) pulse code modulation (PCM) telephone system, a digital to analogue converter is used to convert PCM samples from a selected TDM channel into an analogue signal. Thereafter, the signalling receiver detects the appropriate signalling and translates the signalling into a code compatible with the operation of an associated TDM switching facility.

The use of digital signal processors for processing digital signals without first converting the digital signals to an analogue format is discussed by S. L. Freeny, in a paper entitled: "Special Purpose Hardware for Digital Filtering" in the proceedings of the IEEE, Vol. 63, pp. 633–648, published in Apr. 1975, and by J. Allen, in a paper entitled "Computer Architecture for Signal Processing" in the proceedings of the IEEE, Vol. 63, pp 624–632, published in April 1975. Attractive as it might seem to digitally process PCM signalling directly without first converting the PCM samples to analogue signals, such proposals in the past have not been cost competitive in the telephony environment.

There are two types of signalling in telephony which employ frequency combination, DIGITONE® or TOUCHTONE® loop signalling and R1 and R2 trunk signalling. The major distinction between the two is that the DIGITONE or TOUCHTONE format consists of two tones which belong to respective high and low frequency bands. Hence, it is advantageous to use zero crossing techniques for tone detection subsequent to filter separation of the received signal into two frequency bands. That approach is not applicable to R1 or R2 signalling in which a combination of any two of a plurality of prescribed tones is valid. The U.S. Pat. No. 4,076,965 issued to R. E. Olsen and E. A. Munter on Feb. 28, 1978, illustrates the complexity and bulk of mixed digital and analogue circuitry required in a flexible analogue MF signalling receiver design suitable for use in single frequency and multifrequency signalling formats.

It is therefore evident that the realization of a purely digital MF receiver for receiving and distinguishing between a plurality of diverse PCM encoded tone signals requires a very flexible design, thereby suggesting the use of a digital processor. However, in any practical design, the cost of implementing such a receiver must compare favourably with the cost of existing analogue receivers in PCM systems. Recently proposed PCM signalling receivers implemented by using digital microprocessor systems have so far been found to operate too slowly to be able to economically accommodate the real time requirements of telephone signalling.

In accordance with the present invention a substantial improvement in the operational speed of a signalling receiver is obtained by performing simple but highly repetitive signal processing in specialized digital circuitry, with more complex but less repetitive processing being conveniently performed by a microprocessor. In one embodiment of the invention the real time required to receive signalling is reduced sufficiently to permit the signalling receiver to be time shared between a plurality of communication channels.

The signalling receiver of the present invention includes means for receiving PCM signal samples from a TDM channel selected by a controller in an associated TDM switching facility and a digital filtering means for generating binary signal representations of filter functions performed on the received signal samples each corresponding to a signal amplitude of a selected frequency in the received signal samples. A translating means generates data signals indicating the signalling and compatible with the signal format of the controller, in response to the signal amplitude values of the binary signal representations.

The digital filtering means performs filter functions for a plurality of specific predetermined frequencies and is implemented by circuitry which includes wired logic to define such filter function. The wired logic is advantageously provided in the form of a read only memory (ROM). The digital filter is operable at a faster rate than that required to receive one channel of a PCM sample and can therefore be advantageously shared between channels. The inherent speed of the filter is further improved by arranging the ROM to be utilized in parallel/serial configuration so that, in the available real time, more than two channels of PCM samples can be received.

The translation means comprises essentially a microprocessor which is operated according to logic instructions in combination with various timing and steering signals generated in the signalling receiver. The translation means receives the output signals from the filter and translates these signals into data signals indicative of the signalling and compatible with the signal format of the controller.

In one arrangement the speed of the signalling receiver operation is further enhanced by providing alternate modes of operation. At the onset of signalling the processor determines the validity of the initial signalling by performing a first series of processing functions with signals from the digital filtering means. With the continuation of the signalling from the onset of same, the processor performs a different series of functions, less time consuming than the first series of functions, to merely verify the continuity of the signalling.

An example embodiment of the invention will now be described with reference to the accompanying drawings in which.

The structure and operation of the example embodiment will be briefly described with reference to FIG. 1 followed by a more detailed description with reference to the remainder of the drawings. Details pertaining to the provision of power for operating the example embodiment are not described or shown as the provisions of appropriate power supplies and power connections are well within the scope of persons having a general knowledge in the electronic art. Likewise, the routing of clock signals typically required for operation of various types of "off-the-shelf" circuitry such as flip-flops, registers, etc., is also not shown or described, with the exception of areas where such description pertains to special timing signals or otherwise enhances the explanation and understanding of the example embodiment.

In some areas of the example embodiment, read only memories (ROM), typically fused link integrated circuits, are described as providing for various functions. This type of ROM is unique in that its integrated circuit structure is essentially that of a large plurality of individual wired logic networks each selectively connectable to a plurality of output terminals in response to a respective unique address signal. The example embodiment may also be implemented by substituting alternate memory devices for one or more of the ROMs. Examples of some suitable alternate memory devices are: random access memory (RAM), programmable read only memory (PROM) and electronically programmable read only memory (EPROM). However these and other alternate memory devices tend to be more expensive, more volatile and hence less reliable than ROMs.

Figure 1:
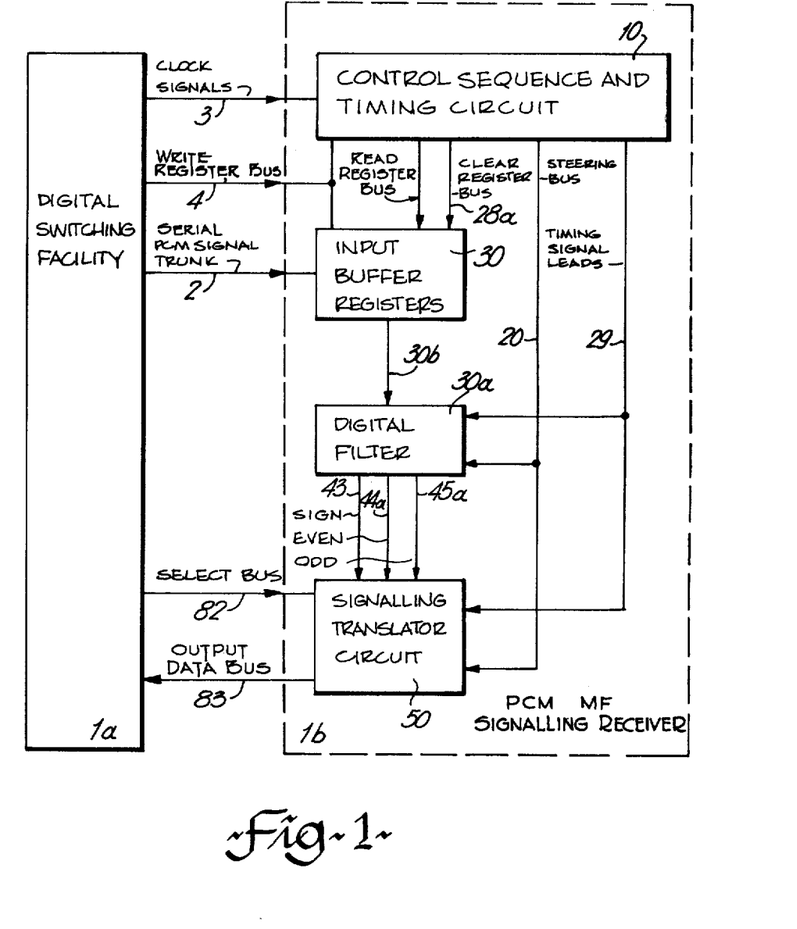
FIG. 1 is a block diagram of a digital signalling receiver in accordance with the invention, the receiver being connected to a telephone switching facility.

The digital switching facility in FIG. 1 is in practice connected with various digital or analogue trunks or any combination thereof. It may also be connected with various telephone subscriber loops. However these are not shown as they are not pertinent to the description of a PCM MF signalling receiver in a digital telephone system. The digital switching facility 1a operates in a format which includes thirty-two ten-bit bytes per frame, the frame repetition frequency being about 8 KHz. A PCM MF receiver 1b is associated with the digital switching facility 1a to receive signalling from the trunks via the facility 1a. Thirty-two PCM channels are connected from the digital switching facility 1a via a serial PCM signal trunk 2 to input buffer registers 30 in the receiver 1b. Clock signals corresponding to the bit rate of the PCM signals on the trunk 2 are connected from the digital switching facility 1a to a control sequence and timing circuit 10 in the receiver 1b via a clock signal lead 3. A write register bus 4 is connected from the digital switching facility 1a to input buffer registers 30 and to the control sequence and timing circuit 10. The write register bus 4 carries signals from a controller in the digital switching facility 1a to cause selected ones of the thirty-two channels of PCM samples to be registered in selected ones of the input buffer register 30. The control sequence and timing circuit 10 generates read signals on a read register bus 27a which cause the PCM samples which were serially registered in the buffer registers 30 to be selectively transmitted in parallel form to a digital filter 30a via leads 30b. After the content of one of the buffer registers 30 is transmitted to the digital filter 30a, a signal is generated on an appropriate one of the leads of a clear register bus 28a by the control sequence and timing circuit 10 to cause the buffer register to be cleared. The digital filter 30a provides output signals representing received signal power of each selected channel sample and also signals representing filter function components corresponding to six multifrequency tone signal bands. These output signals appear in serial/parallel format on leads 43, 44a and 45a, labelled sign, even and odd respectively. These leads carry the output of the digital filter system to a signalling translator circuit 50. Both the digital filter system 30a and the signalling translator circuit 50 are controlled and timed by signals generated in the control sequence and timing circuit 10. Steering and timing signals are carried via a steering bus 20 and a timing bus 29 respectively. These buses are connected from the control sequence and timing circuit 10 to the digital filter 30a and the signalling translator circuit 50. The signalling translator circuit 50 periodically receives the output from the digital filter 30a and generates binary signal codes compatible with the operation of the controller in the switching facility and representing the signalling state of each of the selected four of the thirty-two channels.

Each binary signal code includes information in a format as for example illustrated in table A.

TABLE A

| Function | Signal Bit 7 | Status Bit 6 | Error Bit 5 | Status Bit 4 | Digit/Error Code | | | |
|---|---|---|---|---|---|---|---|---|
| | | | | | Bit 3 | Bit 2 | Bit 1 | Bit 0 |
| Valid Signal | 1 | Y | 0 | Y | X | X | X | X |
| Pause | 0 | 0 | 0 | 0 | 0 | 0 | 0 | 0 |
| Spectral Error | 1 | Y | 1 | Y | 0 | Z | Z | Z |
| Timing Error | 1 | Y | 1 | Y | X | X | X | X |

In the table, XXXX denotes the four-bit code of a digit, ZZZ denotes the three-bit code of a spectral error and YY denotes a two-bit code of signal power range.

The digital switching facility 1a addresses the signalling translator circuit 50 via a select bus 82 connected therebetween, to indicate that signalling information is requested and from which of the four channels it is required. The signalling translation circuit 50 responds to the address on the select bus 82 by transmitting a binary code, in accordance with the format in table A, for the state of the selected channel via an output data bus 83 to the digital switching facility 1a.

Figure 2:
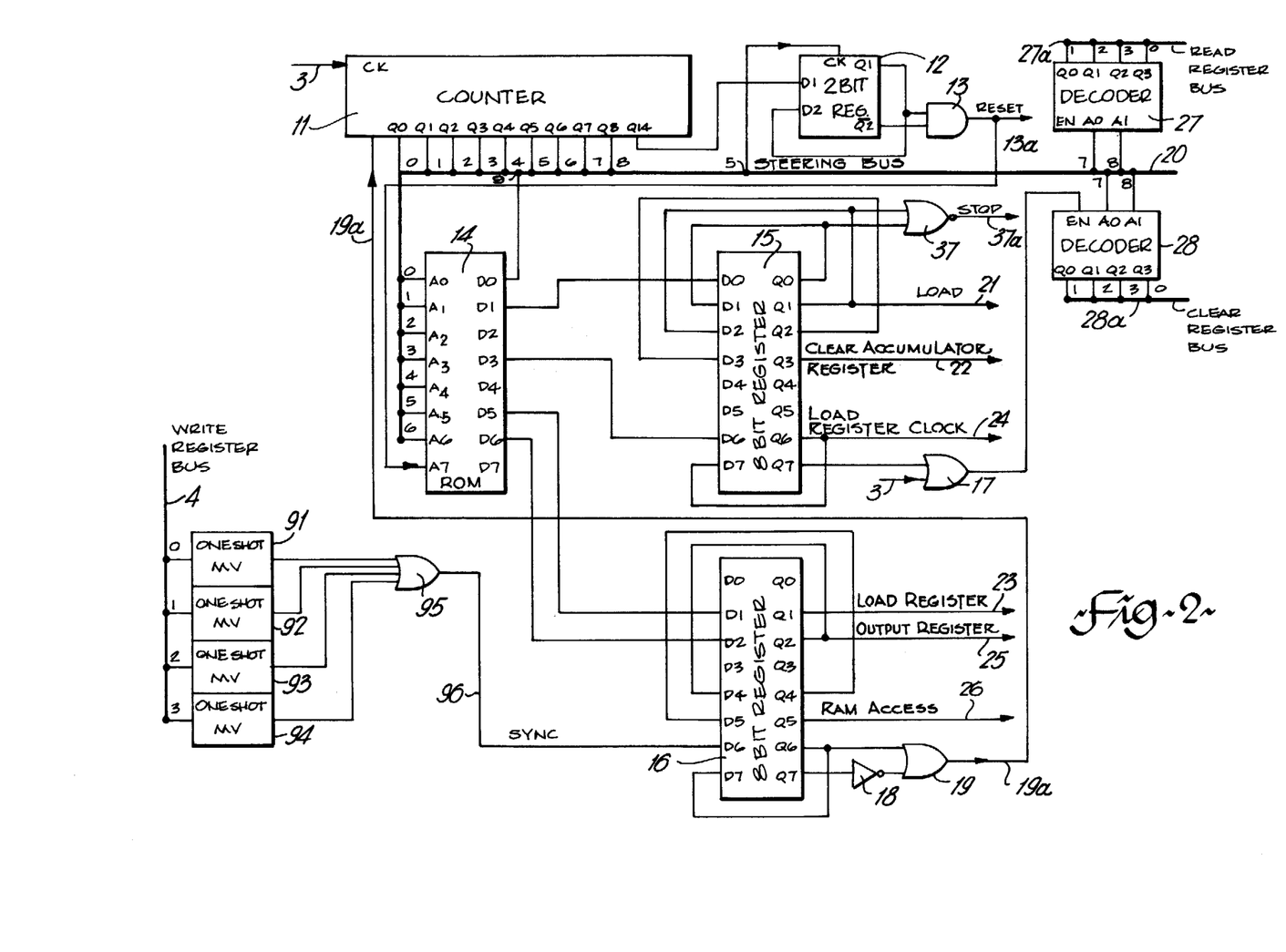
FIG. 2 is a block schematic diagram of a control sequencer and timing circuit used in the signalling receiver of FIG. 1.

Referring to FIG. 2, the control sequence and timing circuit includes a counter 11 having a clock input CK connected to the clock signal lead 3 referred to in the description of FIG. 1. The counter 11 also includes a load input LD and outputs Q0 through Q8 and an output Q14. A signal, synchronized with the frame rate of the digital switching facility 1a is applied to the load input LD via a lead 19a to synchronize the counter 11 at startup. The outputs Q0–Q8 comprise the origin of leads 0 through 8 in the steering bus 20. The output Q14 is connected to an input D1 of a two-bit register 12. The counter 11 may be constructed from "off-the-shelf" components consisting of a divide-by-ten circuit followed by three divide-by-sixteen circuits. In such an arrangement, only the lead input LD of the divide-by-ten circuit is actively connected to the lead 19a so that when a load signal is asserted only the divide-by-ten circuit is set to zero. The two-bit register 12 may consist of two D-type flip-flop circuits connected as illustrated in FIG. 2. Outputs Q1 and $\overline{Q2}$ of the register circuit 12 are connected to an AND gate 13, its output being the origin of a reset lead 13a. The register 12 in combination with the AND gate 13 generates a reset signal every 8 milliseconds on the reset lead 13a, in response to signals from the Q5 and Q14 outputs of the counter 11. In the steering bus 20 the leads 7 and 8 are connected to inputs A0 and A1 respectively of decoders 27 and 28. Each decoder 27 and 28 includes outputs Q0 through Q3. The outputs of the decoder 27 comprise the origin of leads 0 through 3 of the read register bus 27a and the outputs of the decoder 28 comprise the origin of leads 0 through 3 of the clear register bus 28a. The interconnection of these buses and the steering bus 20 will become apparent later with reference to FIGS. 3 and 4.

One-shot multivibrator circuits 91–94 each include an input connected to one of the leads 0–3 respectively in the write register bus 4. Each of the one-shot multivibrator circuits 91–94 also includes an output connected to an input of an OR gate 95 which has an output connected to a sync lead 96.

The remainder of the control sequencer and timing circuit in FIG. 2 is concerned with the generation of timing signals on leads which fall within the general designation of timing signal leads 29 in FIG. 1. A read only memory (ROM) 14 includes address inputs A0 through A6 connected to leads 0 through 6 respectively in the steering bus 20 and an address input A7 connected to the reset lead 13a. The ROM 14 also includes data outputs D0 through D7 with the data output D0 comprising the origin of a lead 9 in the steering bus 20. An 8-bit register 15 includes inputs D0 and D6 connected to outputs D1 and D3 of the ROM 14. Inputs D1, D2, D3 and D7 of the register 15 are connected to outputs Q0, Q1, Q2 and Q6 respectively of the register 15. The output Q1 comprises the origin of a load lead 21 and the output Q6 comprises the origin of a load register clock lead 24. The output Q0 and Q1 of the register 15 are connected to inputs of a NOR gate 37, the output of which comprises the origin of a stop lead 37a. Output Q3 of the register 15 comprises the origin of a clear accumulator register lead 22. An output Q7 of the register 15 is connected to an input of an OR gate 17, another input of which is connected to receive the clock signals from the lead 3. The output of the OR gate 17 is connected to an enable input EN of the decoder circuit 28. An 8-bit register 16 includes inputs D1 and D2 connected to the output D5 and D6 respectively of the ROM 14. Inputs D6 and D7 of the register 16 are connected to the synchronization lead 96 and to an output Q6 of the register 16 respectively. An output Q1 of the register 15 comprises the origin of a load register lead 23. The output Q2 of the register 16 is connected to an input D4 of the same register. The corresponding output Q4 is connected to an input D5. The output Q2 also comprises the origin of an integrator output register lead 25 and an output Q5 of the register 16 comprises the origin of a direct RAM access lead 26. The output Q6 is also connected to an input of an OR gate 19 and an output Q7 of the register 16 is also connected to an input of the OR gate 19 via an inverter 18. The output of the OR gate 19 is connected via the lead 19a to the load input LD of the counter 11.

Figure 5:
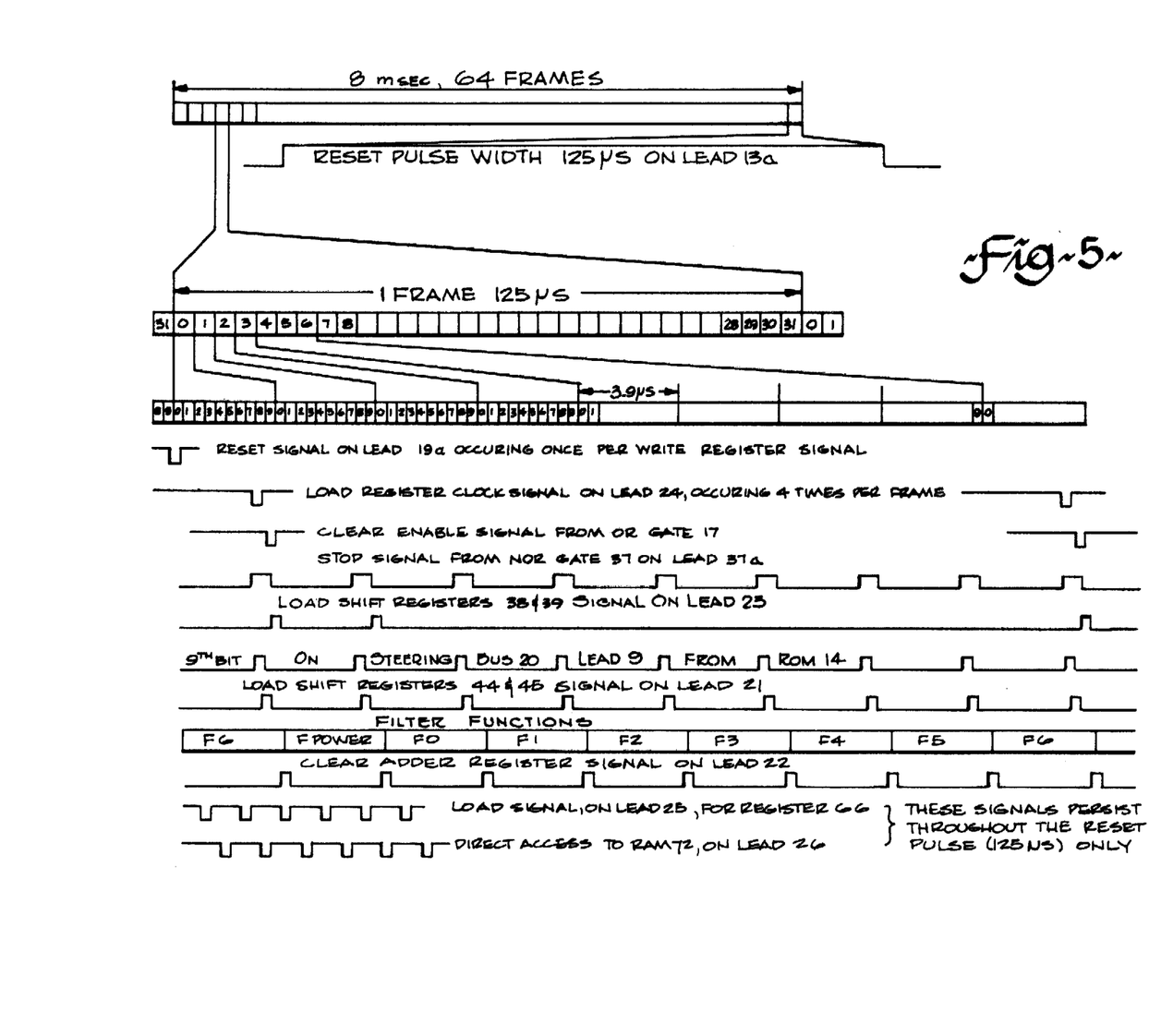
FIG. 5 is a timing diagram illustrating some selected operations of the signalling receiver of FIGS. 1, 2, 3 and 4.

The operation of the control sequence and timing circuit will now be described with reference to FIG. 2 and the timing chart in FIG. 5. All the time scales and wave forms in FIG. 5 are shown in time relationship. At the top of FIG. 5, sixty-four frames of TDM channels are shown occupying a period of about eight milliseconds. The time scale is expanded to show a reset wave form on the lead 13a coincident with the sixty-fourth frame. A single frame is shown to span a period of about one hundred and twenty-five microseconds and includes thirty-two channels, 0–31. The time scale is again expanded to show channels of PCM bytes each having ten bit periods 0–9. Each bit period is about three hundred and ninety nanoseconds and corresponds to the period of the clock signals on the clock signal lead 3. The remaining waveforms in FIG. 2 are shown relative the second expansion of the time scale and the PCM bit periods, the shortest distinction in time being half of one bit period. These waveforms are labelled such that their occurrence and location in the other figures is self evident.

The counter 11 in FIG. 2 counts clock signals appearing on the lead 3, the result of which is a binary number sequence which appears on the leads 0 through 8 of the steering bus 20. In one example the clock signals on the lead 3 have a pulse repetition frequency of 2.56 MHz. The counter 11 is synchronized with the PCM channel timing by a reset signal appearing on the lead 19a which causes the divide-by-ten portion of the counter 11 to be loaded with all zeros. The reset signal occurs in response to a write signal appearing on a lead in the write register bus 4. The associated one-shot multivibrator circuit 91–94 responds to the write signal, causing the D6 input of the register 16 to be asserted, via the OR gate 95 and the synchronization lead 96. The corresponding output Q6 is then likewise asserted causing the reset signal to appear on the lead 19a via the OR gate 19. Q6 being asserted causes the output Q7 to be asserted and thereby terminate the reset signal via the inverter 18 and the OR gate 19. Reset signals having a pulse width of about 125 microseconds and a cycle period of about 8 milliseconds appear on the reset lead 13a. The reset signals on the lead 13a are the result of the clock signals on the lead 3 being divided by $10 \times 2^{11}$ and registered in the register 12, the outputs of which are ANDed by the AND gate 13. The ROM 14 is addressed by the counter 11 and includes logic as required to drive the registers 15 and 16 along with the associated gates to generate the timing signals illustrated in the timing chart of FIG. 5.

Figure 3:
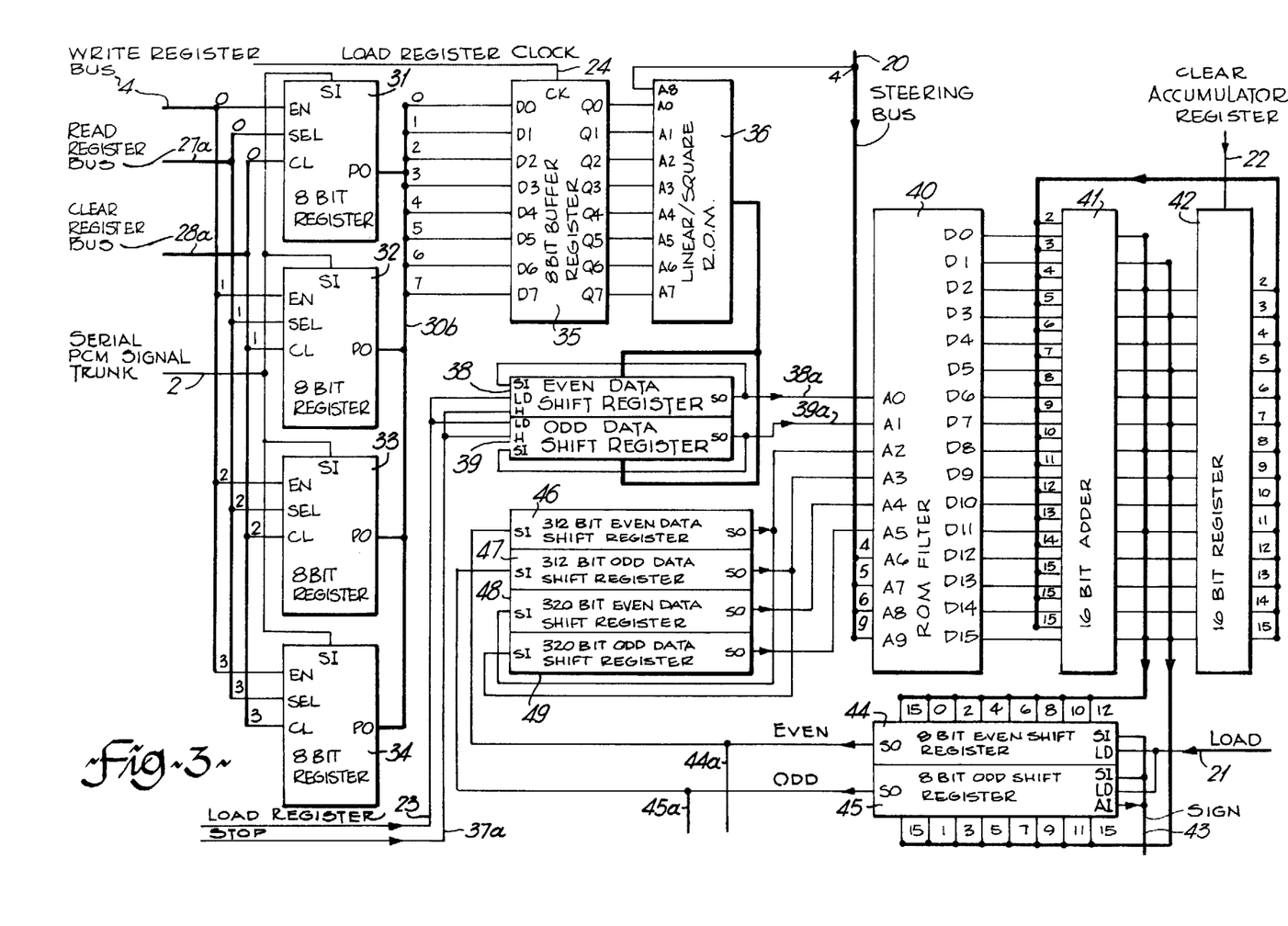
FIG. 3 is a block schematic diagram of a digital filter and input buffer register used in the signalling receiver of FIG. 1.

Referring to FIG. 3, the input buffer registers 30, referred to in FIG. 1, are provided by 8-bit serial/parallel registers 31–34. Each of the registers 31–34 includes three control inputs; an enable input EN connected to a respective lead in the write register bus 4, a select input SEL connected to a respective lead in the read register bus 27a, and a clear input CL connected to a respective lead in the clear register bus 28a. Each of the registers 31–34 also includes a serial input SI connected to the serial PCM signal trunk lead 2, and an eight lead parallel output PO connected to leads 0 through 7 of the parallel PCM output bus 30b.

In operation, write signals are received from the digital switching facility 1a via the write register bus 4. A write signal appearing on a lead in the write register bus 4 causes the associated one of the input buffer registers 31 through 34 to serially load a PCM sample from the trunk 2. Within the next 8 msec., a read signal is generated by the decoder 27 and appears on a corresponding lead of the bus 27a which causes the contents of the input buffer register to appear via the parallel output PO on the bus 30b. Immediately thereafter, a clear signal appears on the corresponding lead of the clear register bus 28a causing the register to be cleared to all zeros. In the event that there is no following write signal directed to the input buffer register for some time, clearing of the register prevents the on-following circuitry from receiving repeated false indications of PCM samples.

In the digital filter an 8-bit buffer register 35 is connected between the parallel PCM has 30b and a linear/square read only memory 36. Eight data inputs D0 through D7 of the register 35 are connected to the parallel PCM bus 30b and a clock input CK is connected to the load register clock lead 24. Eight outputs Q0 through Q7 of the register 35 are connected to eight corresponding address inputs A0 through A7 of the ROM 36. An address input A8 of the ROM 36 is connected to the lead 4 of the steering bus 20. The output of the ROM 36 is connected to parallel inputs of even and odd data shift registers 38 and 39 such that the even register 38 receives only output bits of even numbered significance, and the odd register 39 receives only output bits of odd numbered significance. The load lead 21 is connected to load inputs LD of the shift registers 38 and 39. Each shift register 38 and 39 also includes a serial output SO connected to a corresponding serial input SI, and a hold input H connected to the stop lead 37a.

The ROM 36 is used to expand each sample of the PCM signal to its linear representation and to provide an approximation of the power of each sample. Accordingly the ROM 36 contains linear representation and corresponding approximate linear square representations of two hundred and fifty-six eight-bit PCM words employed for transmission in the digital switching facility. PCM data from the registers 31–34 is selectively applied via the register 35, to the address inputs A0 through A7 of the ROM 36. During each application of a PCM word, the signal applied to the address input A8 causes the ROM 36 to be addressed in its approximate linear square memory portion and thereafter in its linear memory portion. The even and the odd bits of the approximate square word and the linear word appearing at the output of the ROM 36 are each loaded into the parallel inputs of the shift registers 38 and 39 respectively, under the control of the load signal on the load register lead 23.

A filter ROM 40 includes address inputs A0 through A9 and data outputs D0 through D15 connected to an accumulator having a 16-bit adder 41 and a 16-bit register 42. The 16-bit register 42 includes a clear input connected to the clear accumulator register lead 22. The address inputs A0 and A1 of the ROM 40 are connected to the serial outputs SO of the even and odd shift registers 38 and 39 via leads 38a and 39a respectively. Eight-bit even and odd shift registers 44 and 45 include parallel inputs for receiving even bits 0–12 and also bit 15, and odd bits 1–11 and bit 15, respectively from the output of the adder 41. Serial outputs SO of the even shift register 44 and the odd shift register 45 are connected to even and odd leads 44a and 45a respectively and to serial inputs SI of 312-bit even and odd data shift registers 46 and 47 respectively. Each of the shift registers 44 and 45 include a load input LD connected to the load lead 21 and a serial data input SI connected in common to an output AI from the last stage of the odd shift register 45. The output AI is also the origin of the sign lead 43. Serial outputs SO of the shift registers 46 and 47 are connected to the address inputs A2 and A3 of the ROM 40 and to serial inputs SI of 320-bit serial even and odd data shift registers 48 and 49 respectively. The shift register 48 includes a serial output SO connected to the address input A4 of the ROM 40 and the shift register 49 includes a serial output SO connected to the address input A5 of the ROM 40. The remaining address inputs A6–A9 of the ROM 40 are connected to the leads 4, 5, 6 and 9 of the steering bus 20.

The filter ROM 40 contains data in memory locations accessible by binary addresses. The filter ROM 40 in combination with the associated circuitry causes the digital filter system to addressably assume the characteristics of six narrow band filters, and an all-pass filter via which the approximate linear square output from the ROM 36 is transferred through the digital filter. Each narrow band filter passband corresponds to one of the six MF signalling frequencies. The use of the all-pass filter characteristic is convenient as it provides a route by which the approximate linear square output from the ROM 36 is passed through the digital filter system. This output could be routed directly to the signalling tranlator circuit in FIG. 4 but at the greater expense of at least an additional buffer circuit and appropriate timing leads.

In operation, the approximate linear square value and thereafter the linear value of a PCM sample are sequentially registered in the even and odd registers 38 and 39. The registers 38 and 39 serially shift the registered bits via the leads 38a and 39a to the address inputs A0 and A1 of the filter ROM 40. The data is also recirculated through the registers 38 and 39 via the respective serial inputs SI. Hence with each occurrence of an address on the steering bus 20, the data bits from the ROM 36 are serially presented to the filter ROM 40 in pairs, progressing from the least significant bits towards the most significant bits. As the least significant bit of the address on the steering bus occurs at one-tenth the rate of the system clock signals on the lead 3, the recirculation function of the shift register 38 and 39 is halted for two of every ten clock signals by a stop signal on the stop lead 37a. Each linear value is presented by the registers 38 and 39 to the ROM 40 seven times as described above, each time in the presence of a different one of seven filter function addresses from the steering bus 20. Each time an approximate square value is loaded into the registers 38 and 39 it is presented once in the presence of the all-pass filter function address.

The filter ROM 40 generates read-out signals at the outputs D0–D15 with each occurrence of the clock signal. The read-out signals are accumulated over a period of eight cycles of the clock signal by the adder 41 and the register 42. As space in the accumulator is limited, the interconnection between the output of the register 42 and the input of the adder 41 is arranged to shift the registered data two places in the direction of lesser significance with each addition, thus discarding the two least significant bits. The address on the steering bus 20 includes a signal on the ninth lead which is asserted at the moment of the eighth or last sample appearing at the inputs A0–A5 of the filter ROM 40. This causes a 'two's complement' readout at the outputs D0–D15 of the filter ROM 40, which effects a subtraction operation in the accumulator. At the end of each accumulation the shift registers 44 and 45 are loaded with the accumulated result which is in two's complement binary signal form. The wired data in the filter ROM 40 and the circuitry being so configured, produces an output which is a ¼ representation of filtered amplitude or power value, as the case may be. As the data is in two's complement binary form, it is multiplied by four to generate the required filter function value by loading the sign bit 15 of the accumulated value into the first stage of each shift register 44 and 45. The sign bit 15 is also loaded at the last stage of the shift register 45 with the bits 13 and 14 from the adder 41 being ignored. The accumulator register 42 is then set to all zeros by a signal on the clear accumulator register lead 22. Commensurate with the outputting of the sample from the shift registers 38 and 39, data bits from the registers 44 and 45 are accepted at the serial inputs SI of the shift registers 46 and 47 respectively. Meanwhile, the sign bit 15 is continuously loaded at the serial inputs SI of the registers 44 and 45 via the sign lead 43.

The 312-bit shift registers 46 and 47 are operated continuously at the system clock rate to register the data bits on the leads 44a and 45a. In ten clock periods the first 8 bits registered are data and the last two bits registered are don't cares. It should also be noted that the steering bus carries ten addresses per sample. Hence the combined length of the shift registers 44 and 46, and 45 and 47 is such that the result of the preceding filtered sample from a given channel is synchronized with the present sample of the given channel. Likewise, the output of the 320-bit shift registers 48 and 49 provides, in synchronism, the previous preceding filtered sample of the given channel. The addressing of the filter ROM 40, in combination with the data content of the filter ROM 40, provides the required filtering action for six frequencies and for power. As the eighth address on the steering bus is not effectively used in this embodiment the wired data in the filter ROM 40 corresponding to this filter function is arranged to be all zeros.

Figure 4:
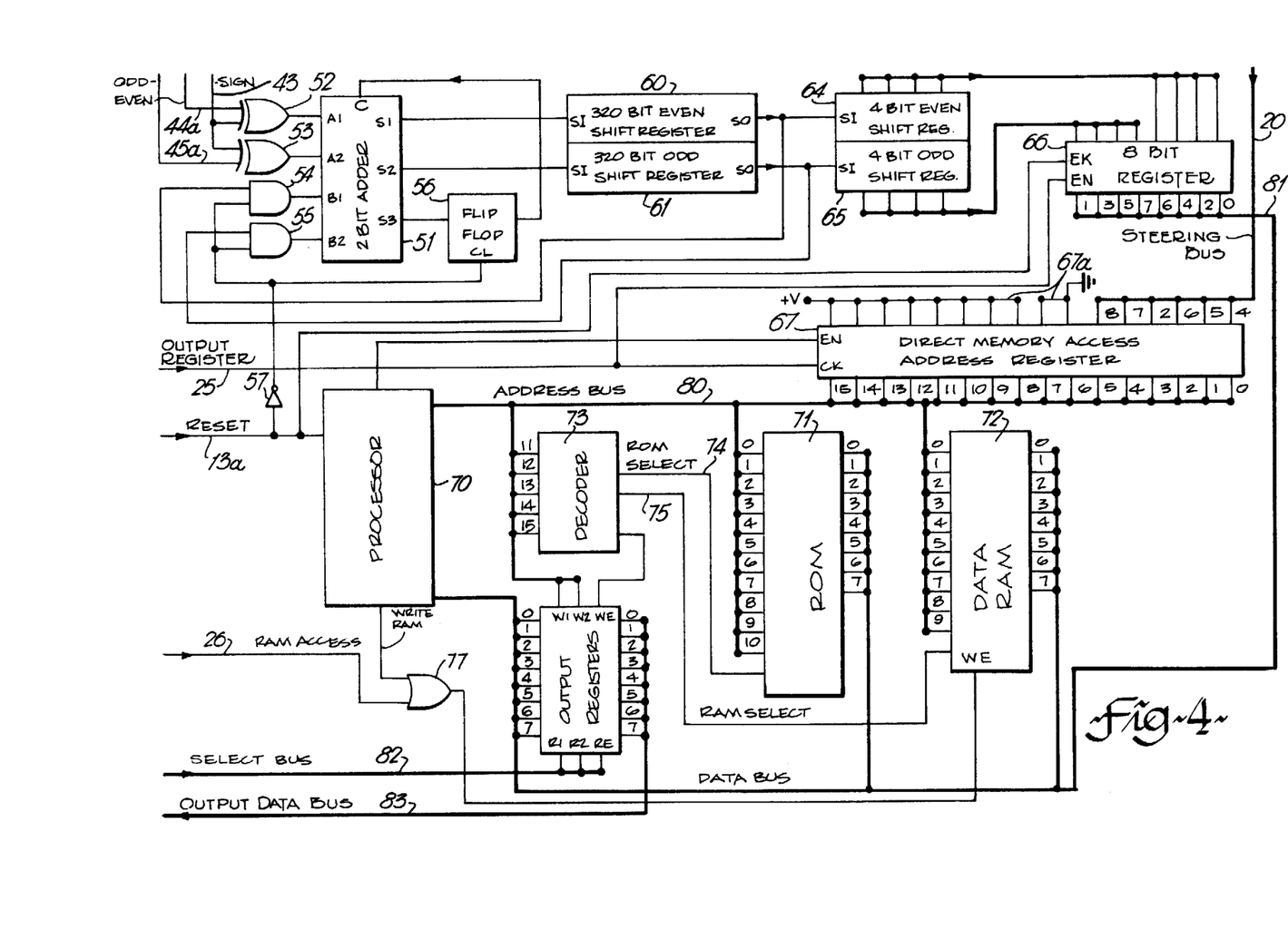
FIG. 4 is a block schematic diagram of a translator circuit used in the signalling receiver of FIG. 1.

Referring to FIG. 4, the binary signals on the even lead 44a, and the sign lead 43 are received bit-by-bit by the signalling translation circuit via an exclusive OR gate 52. Likewise, the binary signals on the odd lead 45a and also the sign lead 43 are received bit by bit via another exclusive OR gate 53. The outputs of the exclusive OR gates 52 and 53 are connected to inputs A1 and A2 of a two-bit adder 51. The reset lead 13a is connected via an inverter 57 to inputs of AND gates 54 and 55 and to the clear input CL of a flip-flop 56. An output of the flip-flop 56 is connected to a carry input C of the adder 51. The outputs of the AND gates 54 and 55 are connected to inputs B1 and B2 of the adder 51. The adder 51 includes outputs S1 and S2 connected to serial inputs SI of two 320-bit even and odd shift registers 60 and 61 respectively. Serial outputs SO of the shift registers 60 and 61 are connected to serial inputs SI of two four-bit shift registers 64 and 65 respectively, and to inputs of the AND gates 54 and 55 respectively. Parallel outputs of the shift registers 64 and 65 are connected to inputs of an 8-bit buffer register 66, the outputs of which are connected to a data bus 81. The shift register 66 also includes a clock input CK connected to the integrator output register lead 25 and an enable input EN connected to the reset lead 13a.

A processor 70, a ROM 71 and a data random access memory (RAM) 72 are interconnected via the data bus 81 and an address bus 80. The processor 70 has an input connected to the reset lead 13a and a write RAM output connected to an input of an OR gate 77. The output of the OR gate 77 is connected to a write enable input of the RAM 72. A group of addressable output registers 85 are connected between the data bus 81 and the output data bus 83. A decoder 73 includes inputs connected with the five most significant leads in the address bus 80, an output connected via a ROM select lead 74 to the ROM 71, an output connected via a RAM select lead 75 to the RAM 72 and an output connected to a write enable input WE of the registers 85. Write address inputs W1 and W2 of the registers 85 are connected to two leads of the address bus 80. The registers 85 also include read address inputs R1 and R2 and a read enable input RE all connected to the select bus 82. A direct memory access address register 67 is connected between the steering bus 20 and the address bus 80. The register 67 includes a clock input CK connected to the lead 25 and an enable input EN connected to a reset acknowledgement output 70a of the processor 70.

In operation, the output of the digital filter 30a is supplied to the signalling translator circuit 50 via the even lead 44a and the odd lead 45a, two data bits at a time with the sign bit being continuously present on the sign lead 43 for the duration of ten clock cycles. The even and odd data bits are exclusive ORed with the sign bit by the gates 52 and 53 respectively and then applied to the inputs A1 and A2 of the adder 51. The adder 51, the gates 54 and 55, the flip-flop 56 and the registers 60 and 61 in combination perform a separate and distinct integration of the absolute value of each filter function output for each of the TDM channels received, during a time period of 8 milliseconds. The output signals from the adder 51 are delayed from appearing at the inputs B1 and B2 by the 320-bit even and odd shift registers 60 and 61. A carry signal appearing on the overflow output 53 of the adder 51 is delayed for one clock period by the flip-flop 56 and then applied to the carry input C of the adder 51. By this means the corresponding filter function outputs for corresponding channel samples are synchronized and accumulated through an 8 millisecond period as determined by the reset signal on the lead 13a. The reset signal is asserted for one period of the frame rate, about 125 microseconds. The assertion of the reset signal inhibits the AND gates 54 and 55, and clears the flip-flop 56 thereby initiating a new accumulation period. Also, during the reset signal the data resulting from the past integrations is shifted out of the shift registers 60 and 61 via the shift registers 64 and 65 and registered in parallel form in the register 66. The processor 70 is disabled by the reset signal for the duration of the 125 microsecond period so that under the control of the clock signal on the lead 25 the data received by the register 66 is assembled in parallel bytes and applied to the data bus 81. At the same time the register 67 transfers the signals on the steering bus to the address bus 80. Thus in response to the signal on the direct RAM access lead 26, the RAM 72 is caused to record all the data accumulated in the just-completed integration period, at address locations determined by the signals on the steering bus and in an address range as determined by permanent signal input connections 67a on the buffer register 67. By the end of the 125 microsecond assertion period of the reset signal all the signalling information has been loaded into the RAM 72. The processor 70 resumes operation with the associated circuitry to translate the signalling into codes compatible with the digital switching facility for example as illustrated in Table A.

Figure 6:
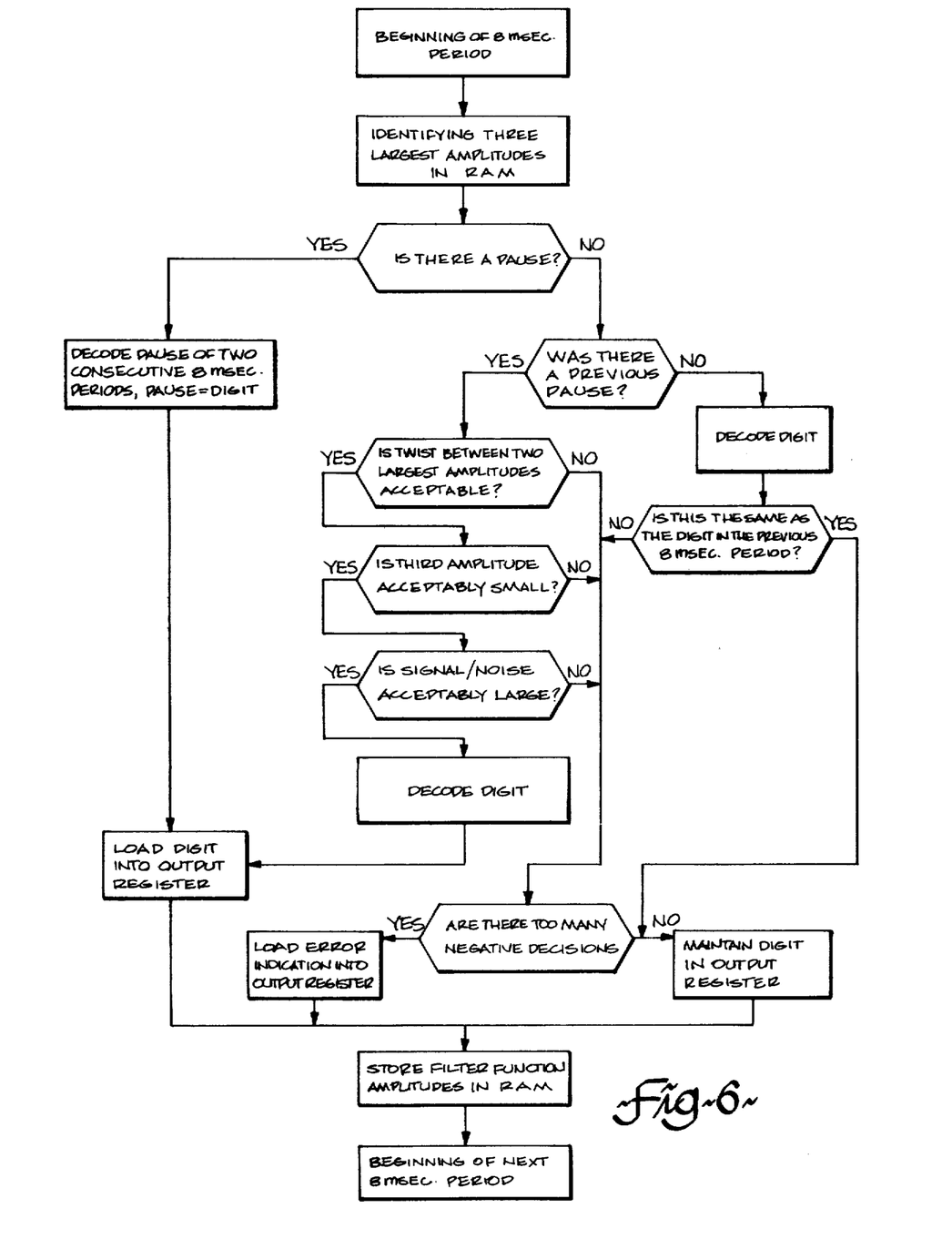
FIG. 6 is a flow chart representation of the functions of the signalling translator circuit of FIG. 4.

To facilitate this function, the processor 70 is directed in its operation to carry out the functions of the flow chart in FIG. 6 by an appropriate sequence of instruction codes lodged in the form of address accessible logic in the ROM 71. It is not intended that the detailed operation of the processor be discussed as it is well within the normal skill of a person familiar with electronic processor applications to specify an appropriate sequence of instruction codes suitable for implementing the functions illustrated in the flow chart of FIG. 6 and table A. It must be considered that any given processor is limited by its range of functions and the speed at which it is capable of being operated. Of course, any selected processor in combination with a specific set of instruction codes must be sufficiently fast to process the results of each filter function within the period between assertions of the reset signal. In the example embodiment a well known microprocessor, type 8085, operated at a cycle time of 1.3 microseconds was found satisfactory when operated with logic instructions for implementing the functions of the flow chart in FIG. 6.

In translating signalling the real time available for processing can be enhanced by subjecting only initialized MF signalling to a rigorous validity test, while subjecting ongoing MF signalling to a continuity check requiring less real time for processing than does the validity test. This method is particularly useful in a signalling receiver adapted to receiving loop signalling as he manual keying of signalling often extends over a time greater than is essential. Accordingly, the outputs of a plurality of digital filters adapted to the loop signalling format can be translated by a single processor.

These two modes of operation are illustrated in the flow chart of FIG. 6 in which two alternative routes are available to process the instant results of any one 8 msec. period. On the left side of the flow chart, the functions required to determine the validity of the initial MF signalling of a digit are illustrated. On the right hand side of the flow chart the functions for determining continuing MF signalling of a digit are illustrated.

At the beginning of an 8 msec period, the operation of the signalling translation circuit 50 begins. The three largest filter function amplitudes stored in the RAM 72 are first identified. If two of the three identified signals are above a predetermined amplitude and there was signalling in the previous two 8 msec periods the signalled digit is decoded. If it is the same as the corresponding channel digit decoded in the previous 8 msec period, it is loaded into an appropriate one of the output registers 85. However if the digit is a third occurrence of a digit that is different, the decoded digit is designated as an error.

Again, at the beginning of an 8 msec period, if there are not two amplitudes in the RAM 72 which are above a predetermined threshold and this was the case in the preceding 8 msec period, a pause indication is loaded in the appropriate one of the output registers 85.

In the case where there are two amplitudes above the threshold but there was a previous pause, the amplitudes are subjected to the validity test, which includes a series of checks to see if they meet the requirements for MF signalling. The amplitudes are compared for unbalance, typically termed twist, of greater than about 7 decibels. If more than 7 db of twist is present the signal is determined not valid. In the case of acceptable twist, the smallest of the three amplitudes is compared with the middle amplitude for a twist of greater than about 12 db. If less than 12 db of twist is present the signalling is determined not valid. If this unbalance is acceptably great, the largest amplitude is compared with the approximate power value from the sample period, to determine if the largest MF signalling component is at least about 20 db above other signals considered to be noise occurring in the sampler period. If from the above functions two amplitudes are found to represent valid signalling, the digit they represent is decoded. If the previous 8 msec. period was indicated as a pause, the decoded digit is loaded into the appropriate output register 85.

In one embodiment the filter ROM 40 in the digital filter 30a includes addressable logic as listed in the following tables. The addressable logic provides for six narrow band filter functions and an allpass filter function. The six narrow band filter functions each have a pass band corresponding to one of six tones having frequencies of 700 Hz, 900 Hz, 1100 Hz, 1300 Hz, 1500 Hz and 1700 Hz respectively. These are the standard tone frequencies of the North American MF signalling format. The listing in the tables is directed to the ROM 40 being provided by four ROM devices (0–3) each contributing four of the sixteen output ports of the ROM 40 and having their respective address ports connected in common. Each of the tables is given in hexadecimal notation with the lesser significant bits of the addresses extending across the top of the table, the more significant bits of the addresses extending along the left hand side of the table and the addressable logic comprising the body of the table.

| | Addressable Logic Table for ROM 40-0 | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 000: | 0 | 1 | 2 | 3 | 0 | 1 | 2 | 3 | 0 | 1 | 2 | 3 | 0 | 1 | 2 | 3 |
| 010: | 0 | 1 | 2 | 3 | 0 | 1 | 2 | 3 | 0 | 1 | 2 | 3 | 0 | 1 | 2 | 3 |
| 020: | 0 | 1 | 2 | 3 | 0 | 1 | 2 | 3 | 0 | 1 | 2 | 3 | 0 | 1 | 2 | 3 |
| 030: | 0 | 1 | 2 | 3 | 0 | 1 | 2 | 3 | 0 | 1 | 2 | 3 | 0 | 1 | 2 | 3 |
| 040: | 0 | 0 | 0 | 0 | 1 | 1 | 1 | 1 | 3 | 3 | 3 | 3 | 4 | 5 | 5 | 5 |
| 050: | F | F | F | F | 0 | 0 | 0 | 0 | 2 | 2 | 2 | 2 | 4 | 4 | 4 | 4 |
| 060: | E | E | E | E | F | F | F | F | 1 | 1 | 1 | 1 | 3 | 3 | 3 | 3 |
| 070: | D | D | D | D | E | E | E | E | 0 | 0 | 0 | 0 | 2 | 2 | 2 | 2 |
| 080: | 0 | 0 | 0 | 0 | 1 | 1 | 1 | 1 | 2 | 2 | 3 | 3 | 4 | 4 | 4 | 4 |
| 090: | F | F | F | F | 0 | 0 | 0 | 0 | 2 | 2 | 2 | 2 | 3 | 3 | 3 | 3 |
| 0A0: | E | E | E | E | F | F | F | F | 1 | 1 | 1 | 1 | 2 | 2 | 2 | 2 |
| 0B0: | D | D | D | D | E | E | E | E | 0 | 0 | 0 | 0 | 1 | 1 | 1 | 1 |
| 0C0: | 0 | 0 | 0 | 0 | 1 | 1 | 1 | 1 | 2 | 2 | 2 | 2 | 3 | 3 | 3 | 3 |
| 0D0: | F | F | F | F | 0 | 0 | 0 | 0 | 1 | 1 | 1 | 1 | 2 | 2 | 2 | 2 |
| 0E0: | E | E | E | E | F | F | F | F | 0 | 0 | 0 | 0 | 1 | 1 | 1 | 2 |
| 0F0: | D | D | D | D | E | E | E | E | F | F | F | F | 0 | 0 | 1 | 1 |
| 100: | 0 | 0 | 0 | 0 | 1 | 1 | 1 | 1 | 2 | 2 | 2 | 2 | 3 | 3 | 3 | 3 |
| 110: | F | F | F | F | 0 | 0 | 0 | 0 | 1 | 1 | 1 | 1 | 2 | 2 | 2 | 2 |
| 120: | E | E | E | E | F | F | F | F | 0 | 0 | 0 | 0 | 1 | 1 | 1 | 1 |
| 130: | D | D | D | D | E | E | E | E | F | F | F | F | 0 | 0 | 0 | 0 |
| 140: | 0 | 0 | 0 | 0 | 0 | 0 | 0 | 0 | 1 | 1 | 1 | 1 | 2 | 2 | 2 | 2 |

-continued

| Addressable Logic Table for ROM 40-0 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 150: | F | F | F | F | F | F | F | F | 0 | 0 | 0 | 0 | 1 | 1 | 1 | 1 |
| 160: | E | E | E | E | E | E | E | F | F | F | F | F | 0 | 0 | 0 | 0 |
| 170: | D | D | D | D | D | D | E | E | E | E | E | E | F | F | F | F |
| 180: | 0 | 0 | 0 | 0 | 0 | 0 | 0 | 0 | 0 | 0 | 1 | 1 | 1 | 1 | 1 | 1 |
| 190: | F | F | F | F | F | F | F | F | F | 0 | 0 | 0 | 0 | 0 | 0 | 0 |
| 1A0: | E | E | E | E | E | E | E | E | F | F | F | F | F | F | F | F |
| 1B0: | D | D | D | D | D | D | D | D | E | E | E | E | E | E | E | E |
| 1C0: | 0 | 0 | 0 | 0 | 0 | 0 | 0 | 0 | 0 | 0 | 0 | 0 | 0 | 0 | 0 | 0 |
| 1D0: | 0 | 0 | 0 | 0 | 0 | 0 | 0 | 0 | 0 | 0 | 0 | 0 | 0 | 0 | 0 | 0 |
| 1E0: | 0 | 0 | 0 | 0 | 0 | 0 | 0 | 0 | 0 | 0 | 0 | 0 | 0 | 0 | 0 | 0 |
| 1F0: | 0 | 0 | 0 | 0 | 0 | 0 | 0 | 0 | 0 | 0 | 0 | 0 | 0 | 0 | 0 | 0 |
| 200: | 0 | 1 | E | F | 0 | 1 | E | F | 0 | 1 | E | F | 0 | 1 | E | F |
| 210: | 0 | 1 | E | F | 0 | 1 | E | F | 0 | 1 | E | F | 0 | 1 | E | F |
| 220: | 0 | 1 | E | F | 0 | 1 | E | F | 0 | 1 | E | F | 0 | 1 | E | F |
| 230: | 0 | 1 | E | F | 0 | 1 | E | F | 0 | 1 | E | F | 0 | 1 | E | F |
| 240: | 0 | 0 | F | F | 1 | 1 | 1 | 1 | C | C | C | C | E | E | E | E |
| 250: | F | F | E | F | 0 | 0 | 0 | 0 | B | B | B | B | D | D | D | D |
| 260: | 1 | 1 | 1 | 1 | 3 | 3 | 3 | 3 | E | E | E | E | 0 | 0 | 0 | 0 |
| 270: | 0 | 0 | 0 | 0 | 2 | 2 | 2 | 2 | D | D | D | D | F | F | F | F |
| 280: | 0 | 0 | F | F | 1 | 1 | 1 | 1 | D | D | C | D | E | E | E | E |
| 290: | F | F | E | F | 0 | 0 | 0 | 0 | C | C | C | C | D | D | D | D |
| 2A0: | 1 | 1 | 1 | 1 | 3 | 3 | 3 | 3 | E | E | E | E | 0 | 0 | 0 | 0 |
| 2B0: | 0 | 0 | 0 | 0 | 2 | 2 | 2 | 2 | D | E | D | D | F | F | F | F |
| 2C0: | 0 | 0 | F | F | 1 | 1 | 1 | 1 | D | D | D | D | E | E | E | E |
| 2D0: | F | F | E | F | 0 | 0 | 0 | 0 | C | C | C | C | D | D | D | D |
| 2E0: | 1 | 1 | 1 | 1 | 3 | 3 | 3 | 3 | F | F | F | F | 0 | 0 | 0 | 0 |
| 2F0: | 0 | 0 | 0 | 0 | 2 | 2 | 2 | 2 | E | E | E | E | F | F | F | F |
| 300: | 0 | 0 | F | F | 1 | 1 | 0 | 0 | D | E | D | D | E | F | E | E |
| 310: | F | F | E | F | 0 | 0 | F | 0 | D | D | C | C | E | E | D | D |
| 320: | 1 | 1 | 1 | 1 | 2 | 2 | 2 | 2 | F | F | F | F | 0 | 0 | 0 | 0 |
| 330: | 0 | 0 | 0 | 0 | 1 | 2 | 1 | 1 | E | E | E | E | F | F | F | F |
| 340: | 0 | 0 | F | F | 0 | 0 | 0 | 0 | E | E | E | E | F | F | F | F |
| 350: | F | F | E | F | F | F | F | F | D | D | D | D | E | E | E | E |
| 360: | 1 | 1 | 1 | 1 | 2 | 2 | 2 | 2 | 0 | 0 | 0 | 0 | 1 | 1 | 1 | 1 |
| 370: | 0 | 0 | 0 | 0 | 1 | 1 | 1 | 1 | F | F | F | F | 0 | 0 | 0 | 0 |
| 380: | 0 | 0 | F | F | 0 | 0 | 0 | 0 | F | F | E | F | F | F | F | F |
| 390: | F | F | E | E | F | F | F | F | E | E | E | E | E | E | E | E |
| 3A0: | 1 | 1 | 1 | 1 | 2 | 2 | 2 | 2 | 0 | 1 | 0 | 0 | 1 | 1 | 1 | 1 |
| 3B0: | 0 | 1 | 0 | 0 | 1 | 1 | 1 | 1 | 0 | 0 | F | F | 0 | 0 | 0 | 0 |
| 3C0: | 0 | 0 | 0 | 0 | 0 | 0 | 0 | 0 | 0 | 0 | 0 | 0 | 0 | 0 | 0 | 0 |
| 3D0: | 0 | 0 | 0 | 0 | 0 | 0 | 0 | 0 | 0 | 0 | 0 | 0 | 0 | 0 | 0 | 0 |
| 3E0: | 0 | 0 | 0 | 0 | 0 | 0 | 0 | 0 | 0 | 0 | 0 | 0 | 0 | 0 | 0 | 0 |
| 3F0: | 0 | 0 | 0 | 0 | 0 | 0 | 0 | 0 | 0 | 0 | 0 | 0 | 0 | 0 | 0 | 0 |

| Addressable Logic Table for ROM 40-1 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 000: | 0 | 0 | 0 | 0 | 0 | 0 | 0 | 0 | 0 | 0 | 0 | 0 | 0 | 0 | 0 | 0 |
| 010: | 0 | 0 | 0 | 0 | 0 | 0 | 0 | 0 | 0 | 0 | 0 | 0 | 0 | 0 | 0 | 0 |
| 020: | 0 | 0 | 0 | 0 | 0 | 0 | 0 | 0 | 0 | 0 | 0 | 0 | 0 | 0 | 0 | 0 |
| 030: | 0 | 0 | 0 | 0 | 0 | 0 | 0 | 0 | 0 | 0 | 0 | 0 | 0 | 0 | 0 | 0 |
| 040: | 0 | 0 | 0 | 1 | A | B | B | B | 5 | 5 | 6 | 6 | F | 0 | 0 | 1 |
| 050: | 0 | 1 | 1 | 1 | B | B | C | C | 5 | 6 | 6 | 7 | 0 | 1 | 1 | 1 |
| 060: | 1 | 1 | 2 | 2 | C | C | C | D | 6 | 7 | 7 | 7 | 1 | 1 | 2 | 2 |
| 070: | 2 | 2 | 3 | 3 | C | D | D | E | 7 | 7 | 8 | 8 | 2 | 2 | 2 | 3 |
| 080: | 0 | 0 | 1 | 1 | 7 | 8 | 8 | 9 | F | F | 0 | 0 | 6 | 7 | 8 | 8 |
| 090: | 0 | 1 | 1 | 2 | 8 | 9 | 9 | A | 0 | 0 | 1 | 1 | 7 | 8 | 8 | 9 |
| 0A0: | 1 | 2 | 2 | 3 | 9 | 9 | A | B | 1 | 1 | 2 | 2 | 8 | 9 | 9 | A |
| 0B0: | 2 | 3 | 3 | 4 | A | A | B | B | 1 | 2 | 3 | 3 | 9 | A | A | B |
| 0C0: | 0 | 0 | 1 | 2 | 4 | 4 | 5 | 6 | 8 | 9 | 9 | A | C | D | D | E |
| 0D0: | 0 | 1 | 2 | 3 | 5 | 5 | 6 | 7 | 9 | 9 | A | B | D | E | E | F |
| 0E0: | 1 | 2 | 3 | 3 | 5 | 6 | 7 | 8 | A | A | B | C | E | E | F | 0 |
| 0F0: | 2 | 3 | 4 | 4 | 6 | 7 | 8 | 8 | B | B | C | D | F | F | 0 | 1 |
| 100: | 0 | 0 | 1 | 2 | 0 | 1 | 1 | 2 | 0 | 1 | 2 | 2 | 0 | 1 | 2 | 3 |
| 110: | 0 | 1 | 2 | 3 | 1 | 1 | 2 | 3 | 1 | 2 | 2 | 3 | 1 | 2 | 3 | 3 |
| 120: | 1 | 2 | 3 | 4 | 2 | 2 | 3 | 4 | 2 | 3 | 3 | 4 | 2 | 3 | 4 | 4 |
| 130: | 2 | 3 | 4 | 5 | 2 | 3 | 4 | 5 | 3 | 4 | 4 | 5 | 3 | 4 | 5 | 5 |
| 140: | 0 | 0 | 1 | 2 | B | C | D | E | 7 | 8 | 9 | A | 3 | 4 | 5 | 6 |
| 150: | 0 | 1 | 2 | 3 | C | D | E | F | 8 | 9 | A | B | 4 | 5 | 6 | 7 |
| 160: | 1 | 2 | 3 | 4 | D | E | F | 0 | 9 | A | B | C | 5 | 6 | 7 | 8 |
| 170: | 2 | 3 | 4 | 5 | E | F | 0 | 1 | A | B | C | D | 6 | 7 | 8 | 9 |
| 180: | 0 | 1 | 2 | 3 | 7 | 8 | 9 | A | E | F | 0 | 1 | 5 | 6 | 7 | 8 |
| 190: | 0 | 1 | 2 | 3 | 8 | 9 | A | B | F | 0 | 1 | 2 | 6 | 7 | 8 | 9 |
| 1A0: | 1 | 2 | 3 | 4 | 9 | A | B | C | 0 | 1 | 2 | 3 | 7 | 8 | 9 | A |
| 1B0: | 2 | 3 | 4 | 5 | A | B | C | D | 1 | 2 | 3 | 4 | 8 | 9 | A | B |
| 1C0: | 0 | 0 | 0 | 0 | 0 | 0 | 0 | 0 | 0 | 0 | 0 | 0 | 0 | 0 | 0 | 0 |
| 1D0: | 0 | 0 | 0 | 0 | 0 | 0 | 0 | 0 | 0 | 0 | 0 | 0 | 0 | 0 | 0 | 0 |

-continued

| Addressable Logic Table for ROM 40-1 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 1E0: | 0 | 0 | 0 | 0 | 0 | 0 | 0 | 0 | 0 | 0 | 0 | 0 | 0 | 0 | 0 | 0 |
| 1F0: | 0 | 0 | 0 | 0 | 0 | 0 | 0 | 0 | 0 | 0 | 0 | 0 | 0 | 0 | 0 | 0 |
| 200: | 0 | 0 | 0 | 0 | 0 | 0 | 0 | 0 | 0 | 0 | 0 | 0 | 0 | 0 | 0 | 0 |
| 210: | 0 | 0 | 0 | 0 | 0 | 0 | 0 | 0 | 0 | 0 | 0 | 0 | 0 | 0 | 0 | 0 |
| 220: | 0 | 0 | 0 | 0 | 0 | 0 | 0 | 0 | 0 | 0 | 0 | 0 | 0 | 0 | 0 | 0 |
| 230: | 0 | 0 | 0 | 0 | 0 | 0 | 0 | 0 | 0 | 0 | 0 | 0 | 0 | 0 | 0 | 0 |
| 240: | 0 | 0 | F | F | A | B | 9 | A | A | B | 9 | A | 5 | 5 | 4 | 4 |
| 250: | 0 | 1 | F | 0 | B | B | A | A | B | B | A | B | 6 | 6 | 5 | 5 |
| 260: | E | E | D | E | 9 | 9 | 8 | 8 | 9 | 9 | 8 | 8 | 3 | 4 | 3 | 3 |
| 270: | F | F | E | E | 9 | A | 9 | 9 | A | A | 9 | 9 | 4 | 5 | 3 | 4 |
| 280: | 0 | 0 | E | F | 7 | 8 | 6 | 7 | 0 | 1 | F | 0 | 8 | 8 | 7 | 7 |
| 290: | 0 | 1 | F | 0 | 8 | 9 | 7 | 7 | 1 | 2 | 0 | 1 | 9 | 9 | 8 | 8 |
| 2A0: | E | E | D | D | 5 | 6 | 4 | 5 | E | F | D | E | 6 | 7 | 5 | 6 |
| 2B0: | F | F | E | E | 6 | 7 | 5 | 6 | F | 0 | E | F | 7 | 8 | 6 | 6 |
| 2C0: | 0 | 0 | E | F | 4 | 4 | 2 | 3 | 7 | 8 | 6 | 6 | B | C | A | B |
| 2D0: | 0 | 1 | F | 0 | 5 | 5 | 3 | 4 | 8 | 9 | 7 | 7 | C | D | B | C |
| 2E0: | E | E | C | D | 2 | 3 | 0 | 1 | 5 | 6 | 4 | 5 | A | A | 8 | 9 |
| 2F0: | F | F | D | E | 3 | 3 | 1 | 2 | 6 | 7 | 5 | 6 | A | B | 9 | A |
| 300: | 0 | 0 | E | F | 0 | 1 | E | F | F | 0 | D | E | F | 0 | E | E |
| 310: | 0 | 1 | F | 0 | 1 | 1 | F | 0 | 0 | 1 | E | F | 0 | 1 | F | F |
| 320: | E | E | C | D | E | F | C | D | D | E | C | C | D | E | C | D |
| 330: | F | F | D | E | F | 0 | D | E | E | F | D | D | E | F | D | E |
| 340: | 0 | 0 | E | F | B | C | A | A | 8 | 9 | 6 | 7 | 4 | 5 | 2 | 3 |
| 350: | 0 | 1 | F | 0 | C | D | B | B | 9 | A | 7 | 8 | 5 | 5 | 3 | 4 |
| 360: | E | F | C | D | 9 | A | 8 | 9 | 6 | 7 | 4 | 5 | 2 | 3 | 0 | 1 |
| 370: | F | F | D | E | A | B | 9 | A | 7 | 8 | 5 | 6 | 3 | 4 | 1 | 2 |
| 380: | 0 | 1 | E | F | 7 | 8 | 5 | 6 | 1 | 2 | F | 0 | 8 | 9 | 6 | 7 |
| 390: | 0 | 1 | E | F | 8 | 9 | 6 | 7 | 2 | 3 | 0 | 1 | 9 | A | 7 | 8 |
| 3A0: | E | F | C | D | 5 | 6 | 3 | 4 | F | 0 | D | E | 6 | 7 | 4 | 5 |
| 3B0: | F | 0 | D | E | 6 | 7 | 4 | 5 | 0 | 1 | E | F | 7 | 8 | 5 | 6 |
| 3C0: | 0 | 0 | 0 | 0 | 0 | 0 | 0 | 0 | 0 | 0 | 0 | 0 | 0 | 0 | 0 | 0 |
| 3D0: | 0 | 0 | 0 | 0 | 0 | 0 | 0 | 0 | 0 | 0 | 0 | 0 | 0 | 0 | 0 | 0 |
| 3E0: | 0 | 0 | 0 | 0 | 0 | 0 | 0 | 0 | 0 | 0 | 0 | 0 | 0 | 0 | 0 | 0 |
| 3F0: | 0 | 0 | 0 | 0 | 0 | 0 | 0 | 0 | 0 | 0 | 0 | 0 | 0 | 0 | 0 | 0 |

| Addressable Logic Table for ROM 40-2 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 000: | 0 | 0 | 0 | 0 | 0 | 0 | 0 | 0 | 0 | 0 | 0 | 0 | 0 | 0 | 0 | 0 |
| 010: | 0 | 0 | 0 | 0 | 0 | 0 | 0 | 0 | 0 | 0 | 0 | 0 | 0 | 0 | 0 | 0 |
| 020: | 0 | 0 | 0 | 0 | 0 | 0 | 0 | 0 | 0 | 0 | 0 | 0 | 0 | 0 | 0 | 0 |
| 030: | 0 | 0 | 0 | 0 | 0 | 0 | 0 | 0 | 0 | 0 | 0 | 0 | 0 | 0 | 0 | 0 |
| 040: | 0 | 6 | C | 3 | 9 | 0 | 6 | D | 3 | 9 | 0 | 6 | D | 3 | A | 0 |
| 050: | C | 2 | 9 | F | 6 | C | 2 | 9 | F | 6 | C | 3 | 9 | 0 | 6 | C |
| 060: | 8 | F | 5 | C | 2 | 8 | F | 5 | C | 2 | 9 | F | 5 | C | 2 | 9 |
| 070: | 4 | B | 1 | 8 | E | 5 | B | 2 | 8 | E | 5 | B | 2 | 8 | F | 5 |
| 080: | 0 | 9 | 2 | B | A | 3 | C | 5 | 4 | D | 6 | F | F | 8 | 1 | A |
| 090: | D | 6 | F | 8 | 8 | 1 | A | 3 | 2 | B | 4 | D | D | 6 | F | 8 |
| 0A0: | B | 4 | D | 6 | 6 | F | 8 | 1 | 0 | 9 | 2 | B | B | 4 | D | 6 |
| 0B0: | 9 | 2 | B | 4 | 4 | D | 6 | F | E | 7 | 0 | 9 | 8 | 1 | A | 3 |
| 0C0: | 0 | B | 6 | 1 | 2 | D | 8 | 4 | 5 | 0 | B | 6 | 7 | 2 | D | 9 |
| 0D0: | E | 9 | 4 | 0 | 1 | C | 7 | 2 | 3 | E | 9 | 5 | 6 | 1 | C | 7 |
| 0E0: | D | 8 | 3 | E | F | A | 5 | 1 | 2 | D | 8 | 3 | 4 | F | A | 6 |
| 0F0: | B | 6 | 1 | D | E | 9 | 4 | F | 0 | B | 6 | 2 | 3 | E | 9 | 4 |
| 100: | 0 | C | 9 | 6 | 3 | 0 | D | A | 7 | 3 | 0 | D | A | 7 | 4 | 1 |
| 110: | E | B | 8 | 5 | 2 | F | B | 8 | 5 | 2 | F | C | 9 | 6 | 2 | F |
| 120: | D | A | 7 | 4 | 1 | D | A | 7 | 4 | 1 | E | B | 8 | 4 | 1 | E |
| 130: | C | 9 | 5 | 2 | F | C | 9 | 6 | 3 | 0 | C | 9 | 6 | 3 | 0 | D |
| 140: | 0 | E | C | B | D | C | A | 9 | B | A | 8 | 7 | 9 | 8 | 6 | 5 |
| 150: | F | D | C | A | D | B | A | 8 | B | 9 | 7 | 6 | 8 | 7 | 5 | 4 |
| 160: | E | C | B | 9 | C | A | 9 | 7 | A | 8 | 7 | 5 | 8 | 6 | 5 | 3 |
| 170: | D | B | A | 8 | B | 9 | 8 | 6 | 9 | 7 | 6 | 4 | 7 | 5 | 4 | 2 |
| 180: | 0 | 0 | 0 | 0 | 3 | 3 | 3 | 3 | 7 | 7 | 7 | 7 | B | B | B | B |
| 190: | F | F | F | F | 3 | 3 | 3 | 3 | 7 | 7 | 7 | 7 | A | A | A | A |
| 1A0: | F | F | F | F | 3 | 3 | 3 | 3 | 6 | 6 | 6 | 7 | A | A | A | A |
| 1B0: | F | F | F | F | 2 | 3 | 3 | 3 | 6 | 6 | 6 | 6 | A | A | A | A |
| 1C0: | 0 | 0 | 0 | 0 | 0 | 0 | 0 | 0 | 0 | 0 | 0 | 0 | 0 | 0 | 0 | 0 |
| 1D0: | 0 | 0 | 0 | 0 | 0 | 0 | 0 | 0 | 0 | 0 | 0 | 0 | 0 | 0 | 0 | 0 |
| 1E0: | 0 | 0 | 0 | 0 | 0 | 0 | 0 | 0 | 0 | 0 | 0 | 0 | 0 | 0 | 0 | 0 |
| 1F0: | 0 | 0 | 0 | 0 | 0 | 0 | 0 | 0 | 0 | 0 | 0 | 0 | 0 | 0 | 0 | 0 |
| 200: | 0 | 0 | 0 | 0 | 0 | 0 | 0 | 0 | 0 | 0 | 0 | 0 | 0 | 0 | 0 | 0 |
| 210: | 0 | 0 | 0 | 0 | 0 | 0 | 0 | 0 | 0 | 0 | 0 | 0 | 0 | 0 | 0 | 0 |
| 220: | 0 | 0 | 0 | 0 | 0 | 0 | 0 | 0 | 0 | 0 | 0 | 0 | 0 | 0 | 0 | 0 |
| 230: | 0 | 0 | 0 | 0 | 0 | 0 | 0 | 0 | 0 | 0 | 0 | 0 | 0 | 0 | 0 | 0 |
| 240: | 0 | 6 | 3 | 9 | 9 | 0 | C | 3 | C | 3 | F | 6 | 6 | C | 9 | F |
| 250: | C | 2 | F | 5 | 6 | C | 9 | F | 8 | F | B | 2 | 2 | 9 | 5 | C |
| 260: | 7 | D | A | 0 | 1 | 7 | 4 | A | 3 | A | 7 | D | D | 4 | 0 | 7 |

-continued

| Addressable Logic Table for ROM 40-2 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 270: | 3 | A | 6 | D | D | 3 | 0 | 6 | 0 | 6 | 3 | 9 | 9 | 0 | D | 3 |
| 280: | 0 | 9 | E | 7 | A | 3 | 8 | 1 | B | 4 | 9 | 2 | 5 | E | 3 | C |
| 290: | D | 6 | B | 4 | 8 | 1 | 6 | F | 9 | 2 | 7 | 0 | 3 | C | 1 | A |
| 2A0: | 4 | D | 2 | B | E | 7 | C | 5 | F | 8 | D | 6 | 9 | 2 | 7 | 0 |
| 2B0: | 2 | B | 0 | 9 | C | 5 | A | 3 | D | 6 | B | 4 | 7 | 0 | 5 | E |
| 2C0: | 0 | B | 9 | 4 | 2 | D | C | 7 | B | 6 | 4 | F | D | 8 | 7 | 2 |
| 2D0: | E | 9 | 8 | 3 | 1 | C | A | 5 | 9 | 4 | 3 | E | C | 7 | 5 | 0 |
| 2E0: | 3 | E | C | 7 | 5 | 0 | F | A | E | 9 | 7 | 2 | 0 | B | A | 5 |
| 2F0: | 1 | C | B | 6 | 4 | F | D | 8 | C | 7 | 6 | 1 | F | A | 8 | 3 |
| 300: | 0 | C | 6 | 3 | 3 | 0 | 9 | 6 | 9 | 5 | F | C | C | 9 | 2 | F |
| 310: | E | B | 5 | 1 | 2 | F | 8 | 5 | 7 | 4 | E | A | B | 8 | 1 | E |
| 320: | 2 | F | 8 | 5 | 6 | 2 | C | 9 | B | 8 | 1 | E | F | B | 5 | 2 |
| 330: | 1 | E | 7 | 4 | 4 | 1 | B | 7 | A | 7 | 0 | D | D | A | 4 | 0 |
| 340: | 0 | E | 3 | 1 | D | C | 0 | F | 4 | 2 | 7 | 5 | 2 | 0 | 5 | 3 |
| 350: | F | D | 2 | 0 | D | B | 0 | E | 3 | 1 | 6 | 4 | 1 | F | 4 | 2 |
| 360: | 1 | 0 | 4 | 3 | F | E | 2 | 1 | 5 | 4 | 8 | 7 | 3 | 2 | 6 | 5 |
| 370: | 0 | F | 3 | 2 | E | D | 1 | 0 | 5 | 3 | 8 | 6 | 2 | 1 | 5 | 4 |
| 380: | 0 | 0 | 0 | 0 | 3 | 3 | 3 | 3 | 8 | 8 | 8 | 8 | C | C | C | C |
| 390: | F | F | F | F | 3 | 3 | 3 | 3 | 8 | 8 | 8 | 8 | C | C | C | C |
| 3A0: | 0 | 0 | 0 | 0 | 4 | 4 | 4 | 4 | 9 | 9 | 9 | 9 | C | C | C | C |
| 3B0: | 0 | 0 | 0 | 0 | 3 | 3 | 3 | 3 | 8 | 8 | 8 | 8 | C | C | C | C |
| 3C0: | 0 | 0 | 0 | 0 | 0 | 0 | 0 | 0 | 0 | 0 | 0 | 0 | 0 | 0 | 0 | 0 |
| 3D0: | 0 | 0 | 0 | 0 | 0 | 0 | 0 | 0 | 0 | 0 | 0 | 0 | 0 | 0 | 0 | 0 |
| 3E0: | 0 | 0 | 0 | 0 | 0 | 0 | 0 | 0 | 0 | 0 | 0 | 0 | 0 | 0 | 0 | 0 |
| 3F0: | 0 | 0 | 0 | 0 | 0 | 0 | 0 | 0 | 0 | 0 | 0 | 0 | 0 | 0 | 0 | 0 |

| Addressable Logic Table for ROM 40-3 | | | | | | | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 000: | 0 | 0 | 0 | 0 | 0 | 0 | 0 | 0 | 0 | 0 | 0 | 0 | 0 | 0 | 0 | 0 |
| 010: | 0 | 0 | 0 | 0 | 0 | 0 | 0 | 0 | 0 | 0 | 0 | 0 | 0 | 0 | 0 | 0 |
| 020: | 0 | 0 | 0 | 0 | 0 | 0 | 0 | 0 | 0 | 0 | 0 | 0 | 0 | 0 | 0 | 0 |
| 030: | 0 | 0 | 0 | 0 | 0 | 0 | 0 | 0 | 0 | 0 | 0 | 0 | 0 | 0 | 0 | 0 |
| 040: | 0 | 7 | E | 5 | C | 3 | A | 1 | 8 | F | 6 | D | 4 | B | 2 | 9 |
| 050: | 5 | D | 4 | B | 1 | 8 | F | 6 | D | 4 | B | 2 | 9 | 0 | 7 | E |
| 060: | A | 2 | 9 | 0 | 6 | E | 5 | C | 2 | 9 | 0 | 7 | E | 5 | C | 3 |
| 070: | F | 7 | E | 5 | B | 3 | A | 1 | 7 | E | 5 | C | 3 | A | 1 | 8 |
| 080: | 0 | 0 | 0 | 0 | 7 | 7 | 7 | 7 | E | E | E | E | 5 | 5 | 5 | 5 |
| 090: | E | F | F | F | 5 | 5 | 5 | 5 | C | C | C | C | 3 | 3 | 3 | 3 |
| 0A0: | C | D | D | D | 3 | 4 | 4 | 4 | A | A | A | A | 1 | 1 | 1 | 1 |
| 0B0: | A | B | B | B | 1 | 2 | 2 | 2 | 8 | 8 | 8 | 8 | F | F | F | F |
| 0C0: | 0 | 2 | 5 | 8 | 8 | A | D | 0 | 0 | 2 | 5 | 8 | 8 | A | D | 0 |
| 0D0: | 8 | B | E | 1 | 0 | 2 | 5 | 8 | 8 | A | D | 0 | 0 | 2 | 5 | 8 |
| 0E0: | 0 | 3 | 6 | 9 | 8 | B | E | 1 | 0 | 2 | 5 | 8 | 8 | A | D | 0 |
| 0F0: | 8 | B | E | 1 | 0 | 3 | 6 | 9 | 8 | B | E | 1 | 0 | 2 | 5 | 8 |
| 100: | 0 | D | A | 8 | 8 | 5 | 2 | 0 | 0 | D | A | 8 | 8 | 5 | 2 | 0 |
| 110: | C | A | 7 | 5 | 4 | 1 | E | C | C | 9 | 6 | 4 | 4 | 1 | E | C |
| 120: | 8 | 6 | 3 | 1 | 0 | E | B | 9 | 8 | 5 | 2 | 0 | 0 | D | A | 8 |
| 130: | 4 | 2 | F | D | C | A | 7 | 5 | 4 | 2 | F | D | C | 9 | 6 | 4 |
| 140: | 0 | 7 | F | 7 | F | 6 | E | 6 | E | 5 | D | 5 | D | 4 | C | 4 |
| 150: | 2 | A | 2 | A | 1 | 9 | 1 | 9 | 0 | 7 | F | 7 | F | 6 | E | 6 |
| 160: | 4 | C | 4 | C | 3 | B | 3 | B | 2 | A | 2 | A | 1 | 8 | 0 | 8 |
| 170: | 6 | E | 6 | E | 5 | D | 5 | D | 4 | C | 4 | C | 3 | B | 3 | B |
| 180: | 0 | 0 | 0 | 1 | B | B | B | C | 6 | 6 | 6 | 7 | 1 | 1 | 1 | 2 |
| 190: | C | D | D | E | 7 | 8 | 8 | 9 | 2 | 2 | 2 | 3 | D | D | D | E |
| 1A0: | 8 | 9 | 9 | A | 3 | 4 | 4 | 5 | E | F | F | 0 | 9 | A | A | B |
| 1B0: | 4 | 5 | 5 | 6 | F | 0 | 0 | 1 | A | B | B | C | 5 | 6 | 6 | 7 |
| 1C0: | 0 | 0 | 0 | 0 | 0 | 0 | 0 | 0 | 0 | 0 | 0 | 0 | 0 | 0 | 0 | 0 |
| 1D0: | 0 | 0 | 0 | 0 | 0 | 0 | 0 | 0 | 0 | 0 | 0 | 0 | 0 | 0 | 0 | 0 |
| 1E0: | 0 | 0 | 0 | 0 | 0 | 0 | 0 | 0 | 0 | 0 | 0 | 0 | 0 | 0 | 0 | 0 |
| 1F0: | 0 | 0 | 0 | 0 | 0 | 0 | 0 | 0 | 0 | 0 | 0 | 0 | 0 | 0 | 0 | 0 |
| 200: | 0 | 0 | 0 | 0 | 0 | 0 | 0 | 0 | 0 | 0 | 0 | 0 | 0 | 0 | 0 | 0 |
| 210: | 0 | 0 | 0 | 0 | 0 | 0 | 0 | 0 | 0 | 0 | 0 | 0 | 0 | 0 | 0 | 0 |
| 220: | 0 | 0 | 0 | 0 | 0 | 0 | 0 | 0 | 0 | 0 | 0 | 0 | 0 | 0 | 0 | 0 |
| 230: | 0 | 0 | 0 | 0 | 0 | 0 | 0 | 0 | 0 | 0 | 0 | 0 | 0 | 0 | 0 | 0 |
| 240: | 0 | 7 | 2 | 9 | C | 3 | D | 4 | 8 | 0 | A | 1 | 4 | C | 6 | D |
| 250: | 5 | D | 7 | E | 1 | 8 | 2 | 9 | D | 5 | F | 6 | 9 | 1 | B | 2 |
| 260: | 6 | D | 7 | E | 2 | 9 | 3 | A | E | 6 | 0 | 7 | A | 1 | B | 2 |
| 270: | B | 2 | C | 3 | 7 | E | 8 | F | 3 | B | 5 | C | F | 7 | 1 | 8 |
| 280: | 0 | 0 | 0 | 0 | 7 | 7 | 6 | 6 | 2 | 3 | 2 | 2 | 9 | A | 9 | 9 |
| 290: | E | F | E | E | 5 | 5 | 4 | 4 | 0 | 1 | 0 | 0 | 7 | 8 | 7 | 7 |
| 2A0: | 4 | 4 | 3 | 3 | B | B | A | A | 6 | 7 | 6 | 6 | D | D | C | C |
| 2B0: | 2 | 2 | 1 | 1 | 9 | 9 | 8 | 8 | 4 | 5 | 4 | 4 | B | C | B | B |
| 2C0: | 0 | 2 | B | E | 8 | A | 2 | 5 | 0 | 3 | B | E | 8 | B | 3 | 6 |
| 2D0: | 8 | B | 3 | 6 | 0 | 2 | A | D | 8 | B | 3 | 6 | 0 | 3 | B | E |
| 2E0: | 0 | 2 | A | D | 8 | A | 2 | 5 | 0 | 3 | B | E | 8 | A | 2 | 5 |
| 2F0: | 8 | A | 2 | 5 | 0 | 2 | A | D | 8 | B | 3 | 6 | 0 | 3 | B | E |

-continued

| | | | | | | Addressable Logic Table for ROM 40-3 | | | | | | | | | | |
|---|---|---|---|---|---|---|---|---|---|---|---|---|---|---|---|---|
| ADDR | 00 | 01 | 02 | 03 | 04 | 05 | 06 | 07 | 08 | 09 | 0A | 0B | 0C | 0D | 0E | 0F |
| 300: | 0 | D | 6 | 3 | 8 | 5 | D | A | 0 | E | 6 | 3 | 8 | 6 | E | B |
| 310: | C | A | 2 | F | 4 | 1 | A | 6 | C | A | 2 | F | 4 | 2 | A | 7 |
| 320: | 8 | 5 | D | A | 0 | D | 5 | 2 | 8 | 6 | E | B | 0 | D | 5 | 2 |
| 330: | 4 | 1 | 9 | 6 | C | 9 | 1 | E | 4 | 2 | A | 7 | C | A | 2 | F |
| 340: | 0 | 7 | 1 | 9 | F | 6 | F | 7 | 2 | A | 3 | B | 1 | 9 | 2 | A |
| 350: | 2 | A | 3 | B | 1 | 9 | 2 | A | 4 | C | 5 | D | 3 | B | 4 | C |
| 360: | C | 3 | C | 4 | B | 2 | B | 3 | E | 5 | E | 6 | D | 4 | D | 5 |
| 370: | E | 5 | E | 6 | D | 4 | D | 5 | 0 | 8 | 1 | 9 | F | 6 | F | 7 |
| 380: | 0 | 0 | 0 | 0 | B | B | A | A | A | B | A | A | 5 | 6 | 5 | 5 |
| 390: | C | D | C | C | 7 | 8 | 7 | 7 | 6 | 7 | 6 | 6 | 1 | 2 | 1 | 1 |
| 3A0: | 8 | 8 | 7 | 7 | 3 | 3 | 2 | 2 | 2 | 2 | 1 | 1 | D | D | C | C |
| 3B0: | 4 | 4 | 3 | 3 | F | F | E | E | E | E | E | E | 9 | 9 | 8 | 8 |
| 3C0: | 0 | 0 | 0 | 0 | 0 | 0 | 0 | 0 | 0 | 0 | 0 | 0 | 0 | 0 | 0 | 0 |
| 3D0: | 0 | 0 | 0 | 0 | 0 | 0 | 0 | 0 | 0 | 0 | 0 | 0 | 0 | 0 | 0 | 0 |
| 3E0: | 0 | 0 | 0 | 0 | 0 | 0 | 0 | 0 | 0 | 0 | 0 | 0 | 0 | 0 | 0 | 0 |
| 3F0: | 0 | 0 | 0 | 0 | 0 | 0 | 0 | 0 | 0 | 0 | 0 | 0 | 0 | 0 | 0 | 0 |

In a different embodiment of the tone signalling receiver designed to receive PCM loop signalling tones, the addressable logic in the ROM 40 is required to provide seven filter functions for frequencies different than the above given frequencies and the addressable logic differs accordingly.

What is claimed is:

1. A signalling receiver for receiving pulse code modulated (PCM) tone signals, comprising:
   receiver means for receiving PCM signals from a selected channel;
   means for converting each of the received PCM signals to a corresponding linear binary signal having a plurality of bits;
   means for generating sets of steering signals, each of the steering signals of the set corresponding to a predetermined filter function in the signalling receiver;
   digital filtering means, responsive to the steering signals and the linear binary signals, for performing a plurality of bandpass filter functions with the linear binary signals as directed by the steering signals, and generating filter signals corresponding to the signal amplitudes of the linear binary signals having frequencies corresponding to those frequencies defined by the respective bandpass filter functions;
   translator means, responsive to the steering signals and the filter signals, for detecting the presence of PCM tone signalling and translating said signalling into data signals of a predetermined signal code format.

2. A signalling receiver as defined in claim 1 in which the translator means comprises:
   means for integrating the filter signals through a predetermined period of time to derive an integrated binary signal corresponding to an amplitude value for a series of each of the filter functions;
   means for temporarily storing the integrated binary signals;
   a storage means having stored logic instructions at address accessible locations;
   a processor connected to read said temporarily stored integrated binary signals and said stored logic instructions, the processor being operable according to said stored logic instructions, for identifying the largest two of the temporarily stored integrated binary signals and for comparing the identified signals one with the other to determine the amount of twist therebetween.

3. A signalling receiver as defined in claim 2 in which the converter means also operates to convert the received PCM signals to a power signal corresponding to an approximate square value of the corresponding linear binary signal, and in which the processor is operable according to said stored logic instruction, for comparing the power signal with one of the identified signals to determine a signal to noise ratio of an amount acceptable for valid MF signalling.

4. A signalling receiver as defined in claim 1 wherein the converting means also operates to convert the received PCM signals to power binary signals each corresponding to an approximate square value of a corresponding one of the linear binary signals; and in which the translator means comprises:
   means for individually integrating the filter signals corresponding to each filter function and to the power signals, through a predetermined period of time, to derive an integrated binary signal corresponding to a series of each of the filter functions and power binary signals;
   means for temporarily storing the integrated binary signals;
   storage means having stored logic instructions at address accessible locations;
   a processor connected to read said temporarily stored signals and said stored logic instructions, the processor being operable according to said stored logic instructions for identifying the largest three of the stored integrated signals, comparing the largest two of the identified signals for an amount of twist acceptably small for valid signalling, comparing the second largest identified signal with the smaller identified signal for an amount of difference acceptably large for valid signalling, and coparing one of the largest identified signals with the power binary signals for a signal to noise ratio acceptably large for valid signalling.

5. A signalling receiver as defined in claim 1 in which the digital filtering means comprises:
   memory means having bytes of data bits stored at address accessible locations therein, address ports and data ports, a plurality of the address ports being connected to receive a portion of each of the steering signals, the memory means for presenting selected ones of said bytes at the data ports in response to the signal states of the address ports;

accumulating means connected to the data ports for accumulating the data bytes through a predetermined interval of time to generate one of said amplitude signals;

input means connected to receive the bits of linear binary signals from the converting means and to receive said amplitude signals, the input means for synchronously supplying the address ports with the instant linear binary signal, with the corresponding preceding amplitude signal and with the corresponding previous preceding amplitude signals, each of said signals being so supplied in a series/parallel bit format.

6. A signalling receiver as defined in claim 1 in which the digital filtering means comprises:

memory means having bytes of data bits stored at address accessible locations therein, data ports and pluralities of first, second, third and steering address ports, the steering address ports connected to receive the steering signals, and the data bits arranged to facilitate the filter functions as selected by the steering signals, the memory means for presenting selected ones of the bytes of data bits at the data ports in response to the signal states of the address ports;

input means connected between the converting means and the first address ports for sequentially applying the bits of each linear binary signal, in parallel groupings of at least two, to the first address ports, with each occurrence of one of the steering signals;

accumulating means connected to the data ports for accumulating the bytes through the duration of each individual steering signal to generate a corresponding one of said amplitude signals;

output means connected between the accumulating means and the translating means for sequentially outputting bits of each amplitude signal in said parallel groupings;

second input means connected between the output means and the second address ports for delaying the arrival of said parallel groupings of each amplitude signal at the second address ports a predetermined period of time to synchronize each amplitude signal with a next corresponding linear binary signal and the occurrence of the corresponding filter function;

third input means connected to the third address ports for delaying the arrival of said parallel groupings of each amplitude signal at the third address ports a predetermined amount of time to synchronize each amplitude signal with a next to the next corresponding linear binary signal and the occurrence of the corresponding filter function;

whereby said amplitude signals are sequentially generated.

7. A signalling receiver as defined in claim 1, in which said translator means includes a processor and means for causing the processor to determine the validity of initial PCM MF signalling by performing a series of process functions requiring a first finite period of time to perform, and for causing the processor to determine the continuity of continuing PCM MF signalling by another series of process functions requiring a lesser period of time to perform than said first period of time.

8. A multifrequency signalling receiver for receiving and translating PCM MF signalling into a signal code format compatible with a controller in a time division multiplex (TDM) switching facility, the signalling receiver comprising:

generating means, connected to be synchronized with the TDM switching facility, for generating a set of steering signals on a repetitive basis;

a time-shared filtering means responsive to the steering signals, for performing a plurality of predetermined passband filter functions with a series of PCM signals received from the TDM switching facility and for generating therefrom a corresponding series of amplitude signals relative each of said filter functions;

translator means, responsive to the steering signals and said amplitude signals, for determining the presence of valid signalling and translating said valid signalling into data signals of a predetermined signal code format.

9. A method for translating PCM MF signalling into a signal code format compatible with a controller in a TDM switching facility comprising the steps of:

(a) receiving PCM signals selected by the TDM switching facility;

(b) converting each of the received PCM signals to a corresponding linear binary signal having a plurality of bits;

(c) generating at least one set of steering signals with each frame occurrence in the PCM signal format;

(d) performing a plurality of bandpass filter functions with the linear binary signals as directed by the steering signals and generating amplitude signals consisting of signal bits and corresponding to the signal amplitudes of the linear binary signals having frequencies corresponding to those frequencies defined by the respective passband filter function; and (e) detecting the presence of multifrequency signalling from the amplitude signals and translating the multifrequency signalling, according to the steering signals, into data signals in said signal format.

10. A method as defined in claim 9 wheren the step (d) is performed in a digital filter including a memory having bytes of data bits stored at address accessible locations therein, the step (d) further comprising the steps of:

(f) causing the memory to read out said bytes as selected by address signals applied thereto, said address signals consisting of signal bits and comprising a portion of each of said steering signals;

(g) accumulating the bytes read out by the memory over a predetermined period of time to generate one of said amplitude signals;

(h) generating a portion of each of said address signals from an instant one of the linear binary signals, the corresponding preceding amplitude signal and the corresponding previous preceding amplitude signal; and (i) applying said portion sequentially in serial/parallel format in groups of at least six bits each to the memory during said predetermined period of time.

11. A method as defined in claim 9 in which step (e) comprises the steps of determining if signalling is initial or continuous and in the first case performing a series of processing functions to determine the validity of the signalling, and in the second case performing a different series of processing functions to determine the continuity of the present signalling with respect to immediately previous signalling.

* * * * *